United States Patent

Kimura et al.

[11] Patent Number: 5,307,711
[45] Date of Patent: May 3, 1994

[54] METHOD FOR SPEED STAGE SHIFTING FROM INDEFINITE DRIVING CONDITION

[75] Inventors: Hiromichi Kimura, Okazaki; Kunihiro Iwatsuki, Toyota, all of Japan

[73] Assignee: Toyota Jidosha Kabushiki Kaisha, Toyota, Japan

[21] Appl. No.: 775,547

[22] Filed: Oct. 15, 1991

[30] Foreign Application Priority Data

Oct. 17, 1990 [JP] Japan ................................. 2-278517

[51] Int. Cl.$^5$ ............................................ F16H 61/02
[52] U.S. Cl. ...................................................... 74/857
[58] Field of Search ................. 74/857, 858, 859, 860, 74/866; 364/424.1

[56] References Cited

U.S. PATENT DOCUMENTS

| | | | |
|---|---|---|---|
| 4,353,272 | 10/1982 | Schneider et al. | 74/859 |
| 4,671,139 | 6/1987 | Downs et al. | 74/866 |
| 4,732,055 | 3/1988 | Tateno et al. | 74/866 |
| 4,799,158 | 1/1989 | Patil | 74/866 X |
| 4,819,163 | 4/1989 | Shimizu et al. | 74/872 X |
| 4,891,759 | 1/1990 | Kato | 74/866 X |
| 5,016,494 | 5/1991 | Yamaguchi | 74/857 X |
| 5,020,391 | 6/1991 | Aoki et al. | 74/866 |
| 5,074,167 | 12/1991 | Yoshimura et al. | 74/866 |
| 5,088,351 | 2/1992 | Miyake et al. | 74/866 |
| 5,121,657 | 6/1992 | Asada | 74/866 |

FOREIGN PATENT DOCUMENTS

| | | |
|---|---|---|
| 58-30558 | 2/1983 | Japan . |
| 61-31746 | 2/1986 | Japan . |
| 61-50845 | 5/1986 | Japan . |

*Primary Examiner*—Dirk Wright
*Attorney, Agent, or Firm*—Oblon, Spivak, McClelland, Maier & Neustadt

[57] ABSTRACT

In the speed stage shifting carried out by a speed stage shift pattern in an engine driving mode or a speed stage shift pattern in an inertially running mode according as the vehicle is running in an engine driving condition or an inertially running condition, when the vehicle is running in an indefinite condition between the engine driving condition and the inertially running condition, the engine output is modified to be increased or decreased so that the running condition of the vehicle is shifted definitely into either the engine driving condition or the inertially running condition.

6 Claims, 4 Drawing Sheets

METHOD FOR SPEED STAGE SHIFTING FROM INDEFINITE DRIVING CONDITION

BACKGROUND OF THE INVENTION

1. Field of the Invention

The present invention relates to a method for speed stage shifting of an automatic transmission in a vehicle such as an automobile.

2. Description of the Prior Art

The automatic transmission in a vehicle such as an automobile is automatically shifted among several speed stages according to changes of running conditions of the vehicle so as to provide a most desirable gear ratio available by a reduction gear mechanism incorporated therein at each instant of operation of the vehicle. The running conditions used to determined the speed stage shifting are basically vehicle speed and engine power output conventionally expressed in terms of throttle opening. As well known in the art, the speed stage is shifted from the lowest speed stage such as the first speed stage to a next to the lowest speed stage such as the second speed stage and then further to a next higher speed stage such as the third speed stage and so on as the relative magnitude of vehicle speed to throttle opening increases. In the modern automatic transmission of automobiles incorporating electronic computer control systems, the control of the speed stage shifting is more sophisticated than merely to shift up or down the speed stages according to the relation in magnitude between the vehicle speed and the throttle opening.

In order to accomplish the speed stage shifting with a high quality of smoothness with no minute abrupt change of torque in the rotational power transmission system extending from an engine to driving vehicle wheels by engagement or disengagement of friction engaging means such as clutches and brakes for changing over the route of transmittance of torque in a composite gear mechanism of the transmission, the timing control for the engagement or disengagement of the friction engaging means is essential. Those patterns which provide a high quality speed stage shifting differ according to whether the vehicle is running in an engine driving condition or a inertially running condition when the speed stage of the transmission is shifted.

In FIG. 1, an example is shown with respect to how the rotation speed of the engine or the input rotational member of the transmission changes in the process of an upshifting of the transmission such as from the second speed stage to the third speed stage, according to the disengagement of a first friction engaging means which has been engaged for providing the second speed stage and the engagement of a second friction engaging means which is engaged for providing the third speed stage, thereby generating a change in the output torque of the transmission. When the computing section of the automatic transmission decides the upshifting from the second speed stage to the third speed stage at time point t1, the disengagement of the first friction engaging means is immediately started so that the hydraulic pressure supplied to the first friction engaging means is exhausted through a passage system including an accumulator to present a time-based pressure performance pattern as shown by A in FIG. 1. In certain conventional computer controlled automatic transmission, the computer section judges at the same time or around as it decides the upshifting if the vehicle is in an engine driving condition or an inertially running condition. If the vehicle is in the engine driving condition, the supply of the hydraulic pressure to the second friction engaging means is immediately started at time point t1. Therefore, the hydraulic pressure in the second friction engaging means increases through a passage system incorporating an accumulator to present a time-based pressure performance pattern as shown by B in FIG. 1. According to the gradual progress of the engagement of the second friction engaging means the rotation of the engine is gradually decelerated as shown by a solid line in FIG. 1 under the application of a braking action due a partial engagement of both the first and second friction engaging means, and at time point t3 the rotational speed Ne of the engine is reduced to a rotation speed Ns which provides the same vehicle speed in the third speed stage as it provided in the second speed stage. The supply of the hydraulic pressure to the second friction engaging means is scheduled to place the second friction engaging means into its full engagement at time point t4 behind the time point t3.

When the computing section of the automatic transmission judges that the vehicle is running in an inertially running condition at the same time or around as it decides the upshifting from the second speed stage to the third speed stage, the supply of the hydraulic pressure to the second friction engaging means is delayed as shown by a performance pattern C in FIG. 1. In the inertially running condition, when the first friction engaging means is disengaged, the rotational speed of the engine starts to decrease by itself as shown by a broken line in FIG. 1 even with no application of the braking action due to the engagement of the second friction engaging means. Therefore, in this case it is desirable that the engagement of the second friction engaging means is delayed to avoid too quick deceleration of the engine which would generate an engine braking.

However, in fact, as shown in FIG. 2, in the relation between the vehicle speed and the throttle opening, there is generally an indefinite zone between the engine driving region and the inertially running region which is difficult for the computing section of the automatic transmission to infallibly discriminate the vehicle running condition between the engine driving condition and the inertially running condition. Therefore, if the computing section judged the vehicle is running in the inertially running condition and delays the supply of the hydraulic pressure to the second friction engaging means as shown by the performance pattern C when the vehicle is, however, in a slightly engine driving condition, the rotational speed of the engine will not decrease as expected by the broken line in FIG. 1 but will, for example, remain as shown by a dot-dash line in FIG. 1. In this case, when the second friction engaging means comes into its full engagement at time point t5, the engine is abruptly decelerated and a high peaky rise of torque is generated in the output shaft. On the other hand, if the second friction engaging means is engaged according to the performance pattern B when the vehicle is in a virtually inertially running condition, the engine is decelerated too much as shown by a two dots-dash line in FIG. 1, thereby generating an engine braking and an abysmal fall of torque at the instant of substantial engagement of the second friction engaging means.

SUMMARY OF THE INVENTION

It is therefore the object of the present invention to further improve such an advanced computer controlled automatic transmission of the vehicle from the point of the above-mentioned problems.

According to the present invention, the above-mentioned object is accomplished by a method of shifting speed stages of an automatic transmission in a vehicle powered by an engine, comprising the steps of:

detecting operation parameters related to speed stage shiftings of the transmission, deciding a speed stage shifting based upon the detected operation parameters, judging if the vehicle is running in a condition indefinite between an engine driving condition and an inertially running condition, modifying the output of the engine so as to be increased or decreased when the vehicle is running in said indefinite condition, and shifting the transmission according to a speed stage shift pattern in an engine driving mode or a speed stage shifting pattern in an inertially running mode corresponding to the modification of the engine output toward increase or decrease, respectively.

According to the above-mentioned method for speed stage shifting of the automatic transmission, the speed stage shifting is performed positively according to either the speed stage shift pattern in the engine driving mode or the speed stage shift pattern in the inertially running mode under the definitely corresponding vehicle running condition.

BRIEF DESCRIPTION OF THE DRAWING

In the accompanying drawings.

DESCRIPTION OF THE PREFERRED EMBODIMENT

Figure 3:
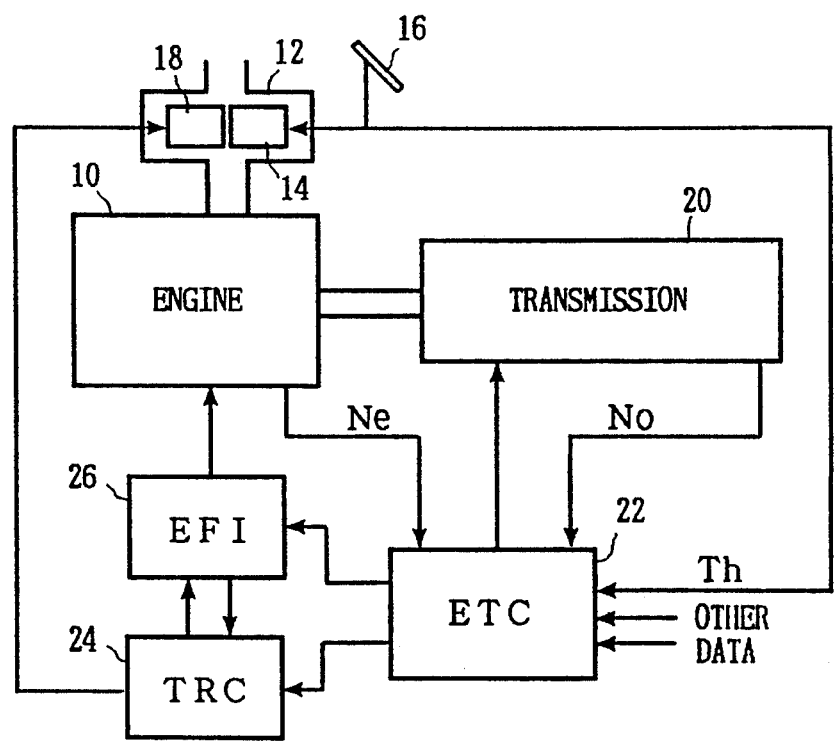
FIG. 3 is a diagrammatical illustration of a control system for carrying out the method for speed stage shifting according to the present invention.

Referring to FIG. 3, the hardware construction herein shown is already known as an advanced computer controlled power system of an automobile. The construction includes an engine 10 adapted to be supplied with intake air through a throttle valve means 12 including a first throttle valve 14 adapted to be operated by an accelerator pedal 16 and a second throttle valve 18 adapted to be operated by an automatic control means as described hereinunder, a transmission gear 20 including a variable reduction gear mechanism, friction engaging means for changing over the variable reduction gear mechanism and a hydraulic circuit for operating the friction engaging means, an electronic transmission control means (ETC) 22 including an electronic computer section and adapted to control the operation of the transmission gear 20 in accordance with various control parameters such as the engine rotation speed Ne, vehicle speed represented by the rotation speed No of the output rotational member of the transmission gear 20, throttle opening Th of the first throttle valve 14 operated by the driver via the accelerator pedal 16 and other input data, a traction control means (TRC) 24 conventionally known as a control means to protect the vehicle from skidding by controlling the output power of the engine through the operation of the second throttle valve 18, and an electronic fuel injection means (EFI) 26. Although not shown in FIG. 3, the traction control means 24 and the electronic fuel injection means 26 are supplied with respective input data to carry out the respectively original control operations which are known in the art and are not directly related with the operation of the present invention.

The present invention may utilize these conventional hardware means for modifying the output of the engine so as to shift the running condition of the vehicle from the indefinite condition between the engine driving condition and the inertially running condition toward either the definite engine driving condition or the definitely inertially running condition.

The control process to carry out the method for speed stage shifting according to one embodiments the present invention is described with reference to FIG. 4. After the start of the control process, in step 1, data necessary for carrying out the present invention are read in. The data includes those necessary for deciding the speed stage shifting and judging the vehicle running condition with respect to the engine driving condition or the inertially running condition. These data are in fact included in those conventionally handled by the electronic transmission control means 22.

In step 2, the calculation for the speed stage control is carried out by the electronic transmission control means 22.

In step 3, it is judged if a speed stage shifting is to be carried out or not. If the answer is no, the control process returns before step 1. If the answer is yes, the control process proceeds to step 4.

Figure 2:
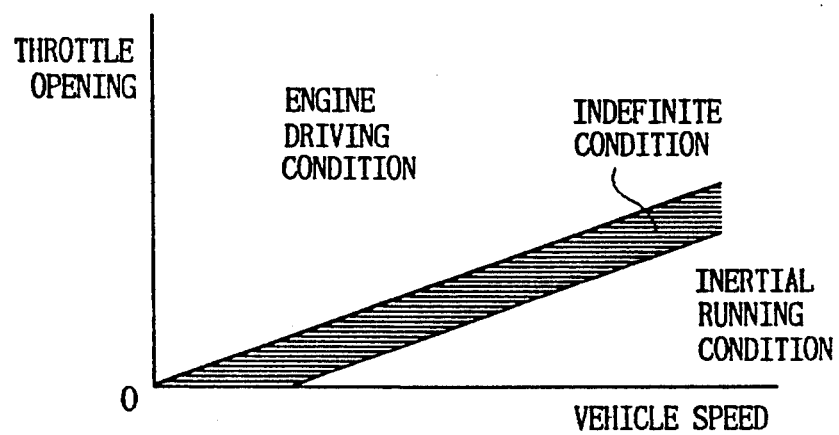
FIG. 2 is a diagram showing the existence of an indefinite condition between an engine driving condition and an inertially running condition.

In step 4, it is judged, based upon certain pertinent calculations incorporated as a software in the electronic transmission control means 22, if the vehicle is running in a condition indefinite between the engine driving condition and the inertially running condition such as the corresponding zone shown in FIG. 2. If the answer is yes, the control process proceeds to step 5, whereas if the answer is no, the control process proceeds to step 6.

In step 6, it is judged if the vehicle is in the engine driving condition or not. If the answer is yes, the control process proceeds to step 7, and a corresponding speed stage shifting is carried out according to a corresponding speed stage shift pattern in an engine driving mode. If the answer in step 6 is no, the control process proceeds to step 8, and a corresponding speed stage shifting is carried out according to a corresponding speed stage shift pattern in an inertially running mode.

When the answer in the judgement in step 4 was yes, the control process proceeds to step 5, and a modification of the output of the engine so as to increase the output of the engine is carried out so that the running condition of the vehicle is shifted more definitely toward the engine driving condition carried out.

Figure 4:
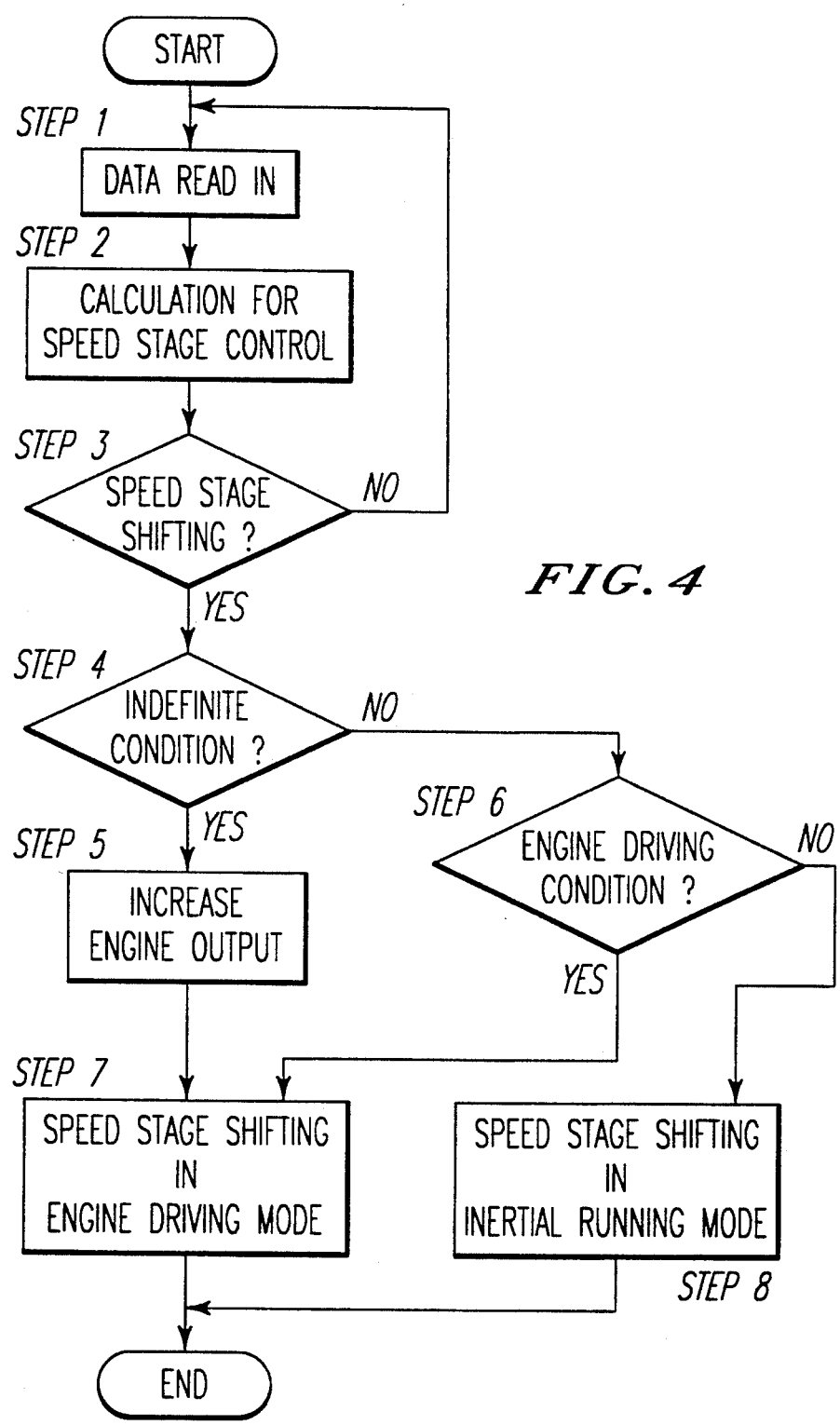
FIG. 4 is flowchart illustrating one embodiment of the control steps in carrying out the method for speed stage shifting according to the present invention.
Figure 5:
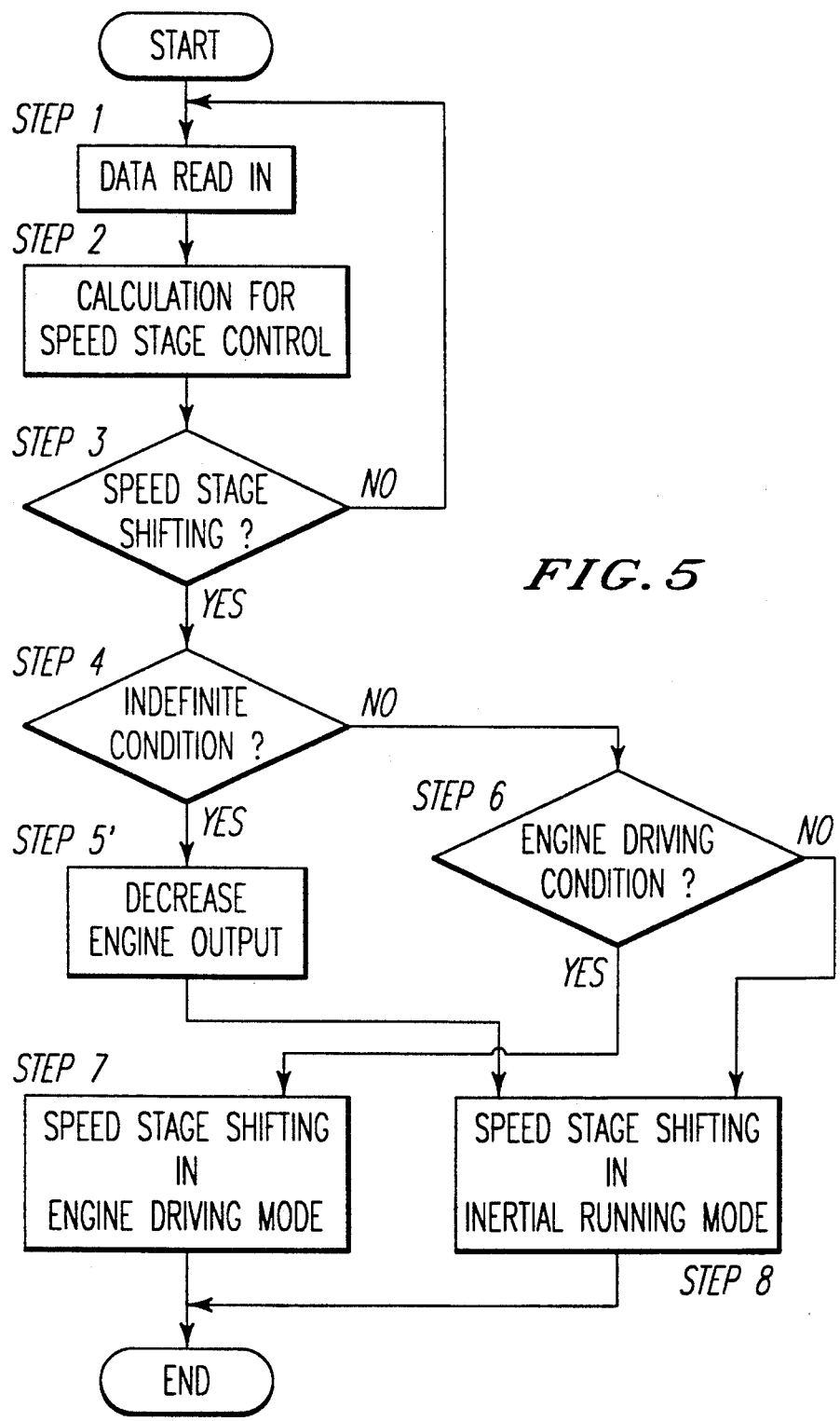
FIG. 5 is a flowchart illustrating another embodiment of the control steps in carrying out the method for speed stage shifting according to the present invention.

The embodiment of FIG. 5 is identical to the embodiment of FIG. 4 except that the engine output is decreased in step 5' so that the running condition of the vehicle is shifted more definitely toward the inertially running condition, and that when the engine output is thus modified toward decrease, the control process proceeds to step 8 and the speed stage shifting according to the speed stage shift pattern in the inertially running mode is carried out.

Figure 1:
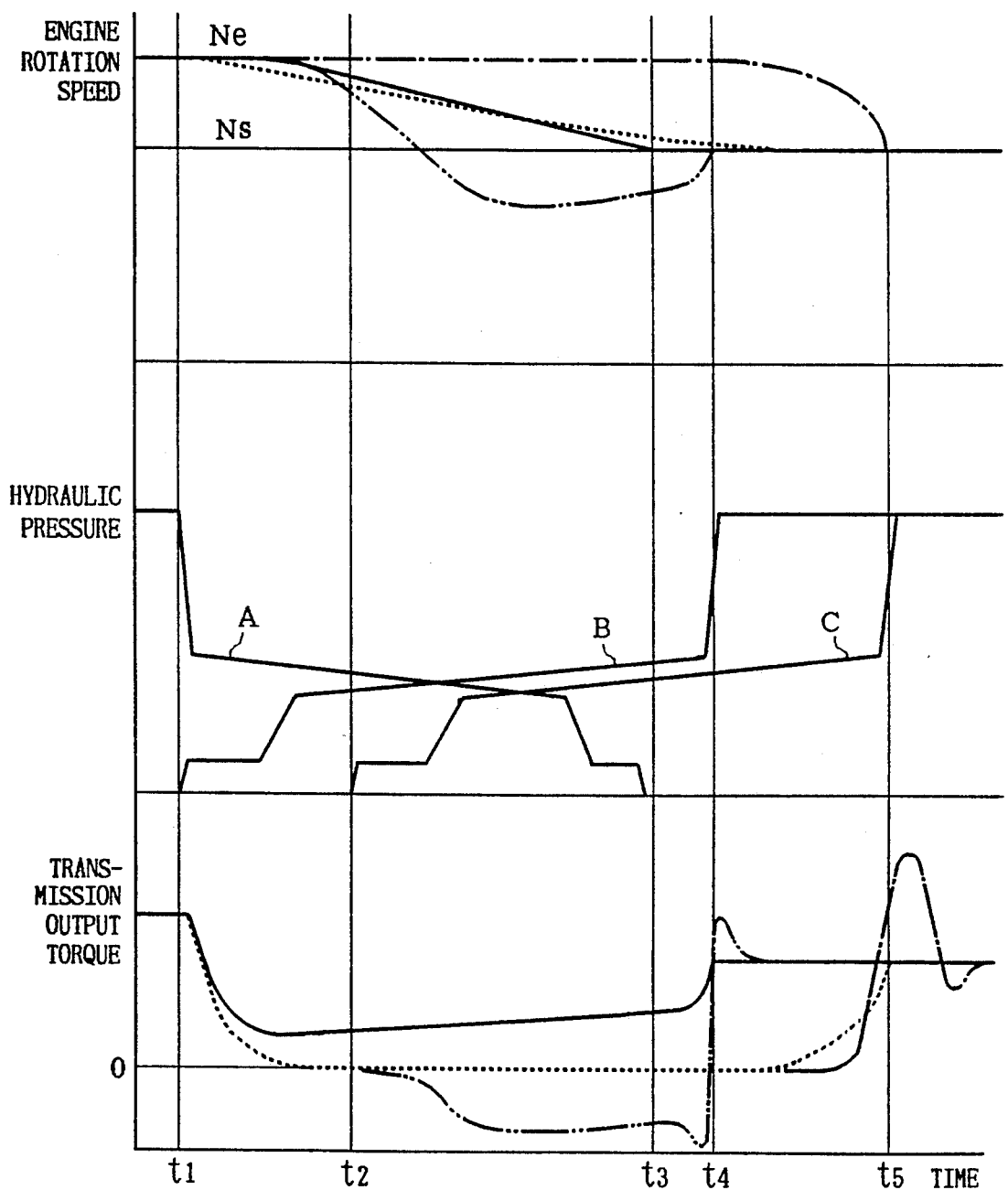
FIG. 1 is a composite diagram showing an example of the performances of the engine rotation speed, the hydraulic pressures in the first and second friction engaging means to be disengaged and engaged, respectively, and the output torque, in an upshifting such as upshifting from the second speed stage to the third speed stage.

The modification of the engine output to increase or decrease in step 5 is carried out by increasing or decreasing the opening of the second throttle valve 18 through the traction control means 24 or by increasing or decreasing the amount of fuel injection through the electronic fuel injection means 26, or by employing both. When the engine output is modified toward increase or decrease, the vehicle running condition is positively shifted out of the indefinite condition into the engine driving condition or the inertially running condition, and therefore, as viewed in the example shown in FIG. 1, when the second friction engaging means is engaged according to the performance pattern B or C according to whether the vehicle running condition is in the engine driving condition or the inertially running condition, the rotational speed of the engine decreases substantially as shown by the solid line or the broken line, so that the shifting up from the second speed stage to the third speed stage is carried out as smoothly as expected.

Although the invention has been described with respect to a preferred embodiment thereof, it will be apparent for those skilled in the art that various modifications are possible with respect to the shown embodiment without departing from the scope of the invention.

We claim:

1. A method of shifting speed stages of an automatic transmission in a vehicle powered by an engine, comprising the steps of:

detecting operation parameters related to speed stage shiftings of the transmission, deciding a speed stage shift based upon the detected operation parameters, judging if the vehicle is running in a condition indefinite between an engine driving condition and an inertially running condition, the indefinite condition being a condition in which an engine driving mode speed stage shift is inappropriate and in which an inertial running mode speed stage shift is also inappropriate, modifying the output of the engine so as to be increased in response to a judgment that the vehicle is running in said indefinite condition, and shifting the transmission according to the speed stage shift pattern in an engine driving mode.

2. A method according to claim 1 wherein the vehicle further comprises a traction control means, and the modification of the engine output is carried out through the traction control means so as to change throttle opening of the engine.

3. A method according to claim 1, wherein the vehicle has an electronic fuel injection means, and the modification of the engine output is carried out through the electronic fuel injection means so as to change the amount of fuel injection.

4. A method of shifting speed stages of an automatic transmission in a vehicle powered by an engine, comprising the steps of:

detecting operation parameters related to speed stage shifting of the transmission, deciding a speed stage shift based upon the detected operation parameters, judging if the vehicle is running in a condition indefinite between an engine driving condition and an inertially running condition, the indefinite condition being a condition in which the engine driving mode speed stage shift is inappropriate and in which the inertial running mode speed stage shift is also inappropriate, modifying the output of the engine so as to be decreased in response to a judgment that the vehicle is running in said indefinite condition, and shifting the transmission according to the speed stage shift pattern in an inertially running mode.

5. A method according to claim 4, wherein the vehicle further comprises a traction control means, and the modification of the engine output is carried out through the traction control means so as to change throttle opening of the engine.

6. A method according to claim 4, wherein the vehicle has an electronic fuel injection means, and the modification of the engine output is carried out through the electronic fuel injection means so as to change the amount of fuel injection.

* * * * *